United States Patent [19]
Lu et al.

[11] Patent Number: 5,528,195
[45] Date of Patent: Jun. 18, 1996

[54] SELECTIVE TYPE QUADRATURE DEMODULATOR

[75] Inventors: Cheng-Youn Lu, Cresskill, N.J.; Robert S. Burroughs, Doylestown, Pa.

[73] Assignee: Panasonic Technologies, Inc.

[21] Appl. No.: 437,794

[22] Filed: May 9, 1995

[51] Int. Cl.⁶ .................................................. H04L 27/38
[52] U.S. Cl. ..................... 329/308; 329/309; 375/327; 375/376
[58] Field of Search ..................... 329/304, 308, 329/309, 310; 375/261, 281, 326, 327, 376

[56] References Cited

U.S. PATENT DOCUMENTS

| | | | |
|---|---|---|---|
| 4,085,378 | 4/1978 | Ryan et al. | 375/472 |
| 4,445,094 | 4/1984 | Ryan | 375/90 |
| 4,571,550 | 2/1986 | Head | 375/39 |
| 4,713,630 | 12/1987 | Matthews | 331/4 |
| 4,860,316 | 8/1989 | Takenaka et al. | 375/39 |
| 5,134,634 | 7/1992 | Yoshida | 375/80 |
| 5,301,210 | 4/1994 | Vandamme et al. | 375/83 |
| 5,347,228 | 9/1994 | Iwasaki | 329/308 |
| 5,440,268 | 8/1995 | Taga et al. | 329/308 |

OTHER PUBLICATIONS

W. N. Waggener, "Designer's Guide to: Digitial syncronization circuits—Part 3", *EDN*, pp. 99–106 (Sep. 1976).
F. M. Gardner, "Self–noise in Synchronizers", *IEE Transactions on Communications*, vol. 28, pp. 1159–1163 (Aug. 1980).

*Primary Examiner*—Siegfried H. Grimm
*Attorney, Agent, or Firm*—Ratner & Prestia

[57] ABSTRACT

A quadrature demodulator for demodulating an input signal which includes respective data signals modulating in-phase and quadrature carriers. The demodulator includes a voltage controlled oscillator responsive to a control signal for generating an oscillatory signal. A demodulator, coupled to receive the oscillatory signal from the voltage controlled oscillator and the input signal, provides the in-phase and quadrature components of the input signal. Phase comparison circuitry, responsive to the in-phase and quadrature components of the input signal generates a phase error signal. The phase error signal represents the difference, in phase and magnitude, between a vector defined by the in-phase and quadrature components of the input signal and reference vectors. Filter circuitry, responsive to the phase error signal, generates a control signal for the voltage controlled oscillator. Phase error correction circuitry selectively applies the error signal to the filter circuitry when the magnitude of a vector defined by the in-phase and quadrature components of the input signal exceeds a first threshold. Another embodiment provides the phase error signal to the filter circuitry when the magnitude of a vector defined by the in-phase and quadrature components of the input signal either exceeds a first threshold or is less than a second threshold.

18 Claims, 14 Drawing Sheets

$$C = \begin{cases} 1 & (\hat{I}, \hat{Q}) \in D_c \\ 0 & (\hat{I}, \hat{Q}) \notin D_c \end{cases}$$

$$D = \begin{cases} 1 & (\hat{I}, \hat{Q}) \in D_D \\ 0 & (\hat{I}, \hat{Q}) \notin D_D \end{cases}$$

$$E = C \oplus D = \begin{cases} 1 & (\hat{I}, \hat{Q}) \in D_E \\ 0 & (\hat{I}, \hat{Q}) \notin D_E \end{cases}$$

$$F = i1 \oplus q1 = \begin{cases} 1 & (\hat{I}, \hat{Q}) \in D_F \\ 0 & (\hat{I}, \hat{Q}) \notin D_F \end{cases}$$

$$G = E \oplus F = \begin{cases} 1 & (\hat{I},\hat{Q}) \in D_G \\ 0 & (\hat{I},\hat{Q}) \notin D_G \end{cases}$$

$$H = i2 \oplus q2 = \begin{cases} 1 & (\hat{I},\hat{Q}) \in D_H \\ 0 & (\hat{I},\hat{Q}) \notin D_H \end{cases}$$

$$J = \begin{cases} 1 & (\hat{I}, \hat{Q}) \in D_J \\ 0 & (\hat{I}, \hat{Q}) \in D_{J'} \\ \text{Hold} & \text{Elsewhere} \end{cases}$$

5,528,195

SELECTIVE TYPE QUADRATURE DEMODULATOR

FIELD OF THE INVENTION

The invention relates to a quadrature demodulator which demodulates input signals having in-phase and quadrature carriers. In particular, the invention selectively adjusts the phase and frequency of the output of a voltage controlled oscillator (VCO) depending upon the magnitude and phase of a vector defined by the demodulated in-phase and quadrature components of the input signal.

BACKGROUND OF THE INVENTION

Quadrature amplitude modulation (QAM) is a type of multi-phase modulation that uses two carriers, an in-phase carrier and a quadrature carrier. Each carrier is modulated respectively to e.g. 2, 4 or 8 modulation states or levels. Thus a multi-amplitude modulation offers, e.g. 4, 16 or 64 states corresponding to the initials 4-QAM, 16-QAM and 64-QAM. The grouping of these states is known as a constellation. In order to demodulate a QAM signal it is desirable to recover the carrier signal from the modulated signal.

There are several known methods of carrier recovery in QAM systems. One type is the selective type digital Costas loop. In contrast to a conventional Costas loop, selective type Costas loops process the baseband phase error signal, generate phase compensation control signals, and then selectively feed these signals to a voltage controlled oscillator (VCO). Specifically, a logical control circuit in the loop passes the phase error signal to the VCO only when the concurrent in-phase and quadrature components of the phase error signal both belong to a predefined rectangular region in the IQ plane.

FIG. 4 shows the in-phase and quadrature coordinate space for 16-QAM where the horizontal axis represents the in-phase component and vertical axis represents the quadrature component. The predefined rectangular regions are shown by dashed lines. Problems occur when phase errors in the recovered carrier signal cause the constellation to be rotated such that a received signal falls in a detection region corresponding to a different signal. This occurs in shaded regions 1 and 2 of FIG. 4. When this happens the reference carrier output signal of the VCO is driven to the wrong phase. For example, in a 16-QAM system as shown in FIG. 4, a signal in the middle ring produces a false error signal (self noise) and appears to be a signal from the outer ring. This causes the Costas loop to try to lock the carrier at a phase which results in a tilted 15 constellation. FIG. 5a illustrates the constellation in the correct position. FIG. 5b illustrates a constellation which has become tilted due to the Costas loop locking the carrier on point A.

SUMMARY OF THE INVENTION

In this invention, polar observation regions, (ring shaped) are used for carrier recovery instead of the rectangular observation regions of the conventional selective type digital Costas loops. These ring shaped detection regions correspond to a constant magnitude vector from the origin for each of the three detection levels in a 16-QAM system, for example. The purpose of the ring-shaped detection regions is to suppress the self-noise effects which occur during carrier acquisition and phase tracking. The overall effect is an improvement in the performance of the Costas loop in being able to acquire and track the carrier component of multilevel QAM modulated signals.

Accordingly there is provided a quadrature demodulator for demodulating an input signal which includes respective data signals modulating in-phase and quadrature carriers. The demodulator includes a voltage controlled oscillator responsive to a control signal for generating an oscillatory signal. A demodulating means, coupled to receive the oscillatory signal from the voltage controlled oscillator and the input signal, provides the in-phase and quadrature components of the input signal. Phase comparison circuitry, responsive to the in-phase and quadrature components of the input signal generates a phase error signal. Filter circuitry, responsive to the phase error signal, generates a control signal for the voltage controlled oscillator. Phase error correction circuitry selectively applies the phase error signal to the filter circuitry when the magnitude of a vector defined by the in-phase and quadrature components of the input signal exceeds a first threshold.

DETAILED DESCRIPTION OF THE INVENTION

Figure 1:
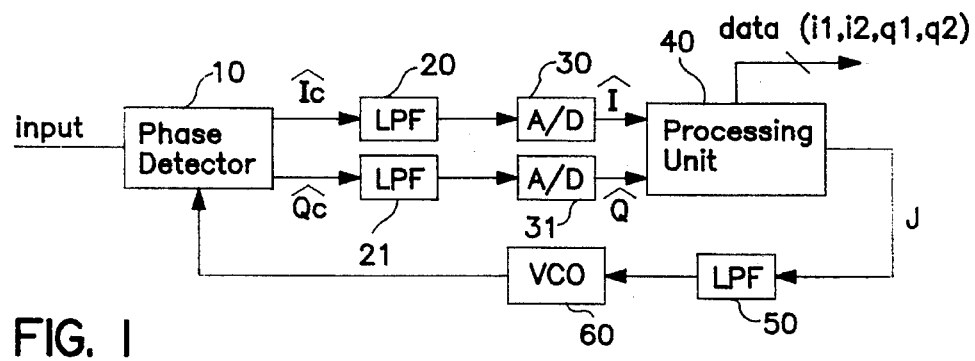
FIG. 1 illustrates a quadrature demodulator according to the present invention.
Figure 3:
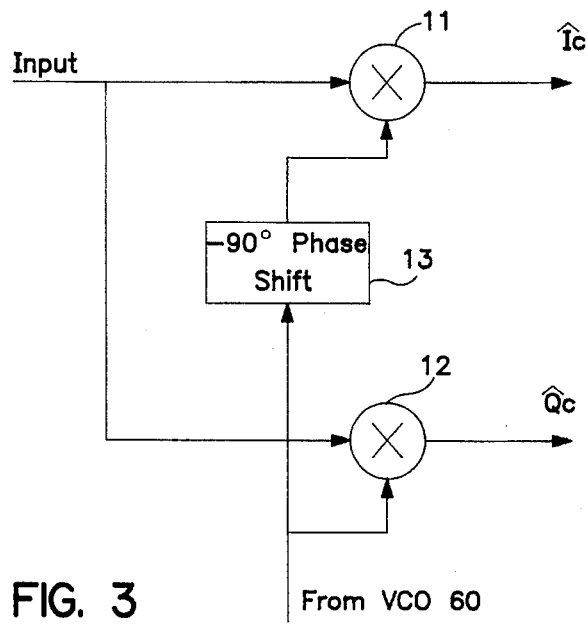
FIG. 3 illustrates a portion of the phase detector.

FIG. 1 illustrates the overall configuration of the demodulator. In FIG. 1, phase detector 10 receives the modulated input signal and produces the respective I and Q components of the input signal. FIG. 3 is a block diagram of a conventional synchronous demodulator which converts the modulated input signal into the respective I and Q components of the input signal, Ic and Qc, respectively.

In FIG. 3, multipliers 11 and 12 are used to multiply the received signal by in-phase and quadrature reference carriers. The quadrature reference carrier is provided from the voltage controlled oscillator 60. The in-phase reference carrier is derived by phase shifting the quadrature carrier by negative 90 degrees in device 13. The output signal of multiplier 11 is the in-phase signal component Ic and the output signal of multiplier 12 is the quadrature signal component Qc.

Referring to FIG. 1, the in-phase and quadrature signal components are low pass filtered by filters 20 and 21. The low pass filtering is performed in order to remove second harmonic components. The low pass filtered in-phase and quadrature components are then converted to digital form by analog to digital convertors 30 and 31.

The processing unit 40 derives the phase error signal J and selectively provides the phase error signal to low pass filter 50. Low pass filter 50 is the loop filter of the phase locked loop (PLL) that generates the carrier signals for the phase detector 10. The output signal of the low pass filter 50 controls the voltage controlled oscillator 60 and alters the phase and frequency of the oscillatory signal generated by the voltage controlled oscillator 60 in a sense which tends to reduce the amplitude of the phase error.

Figure 2:
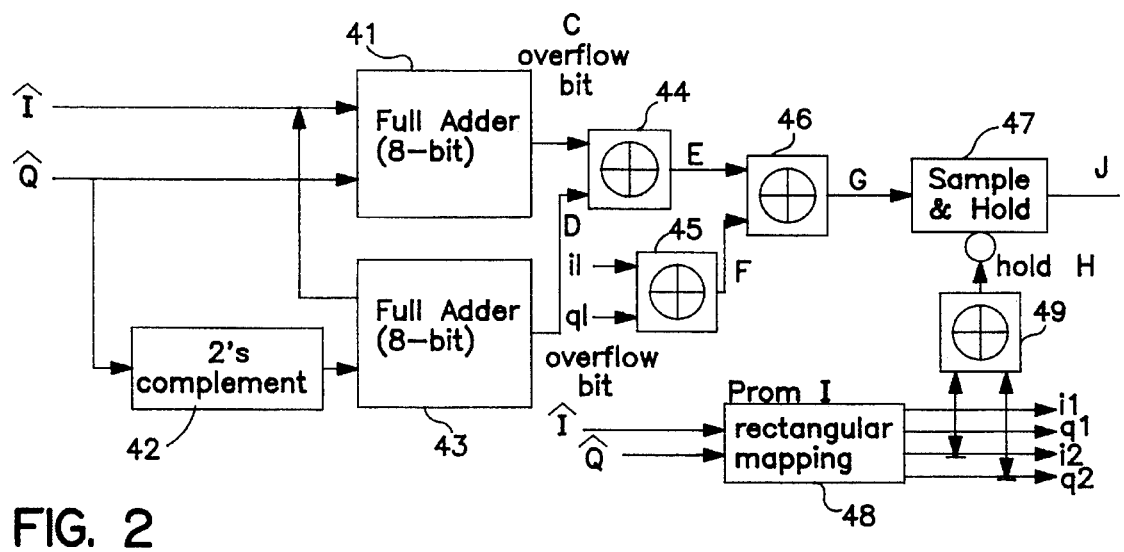
FIG. 2 illustrates the details of the processing unit of FIG. 1.
Figure 7A:
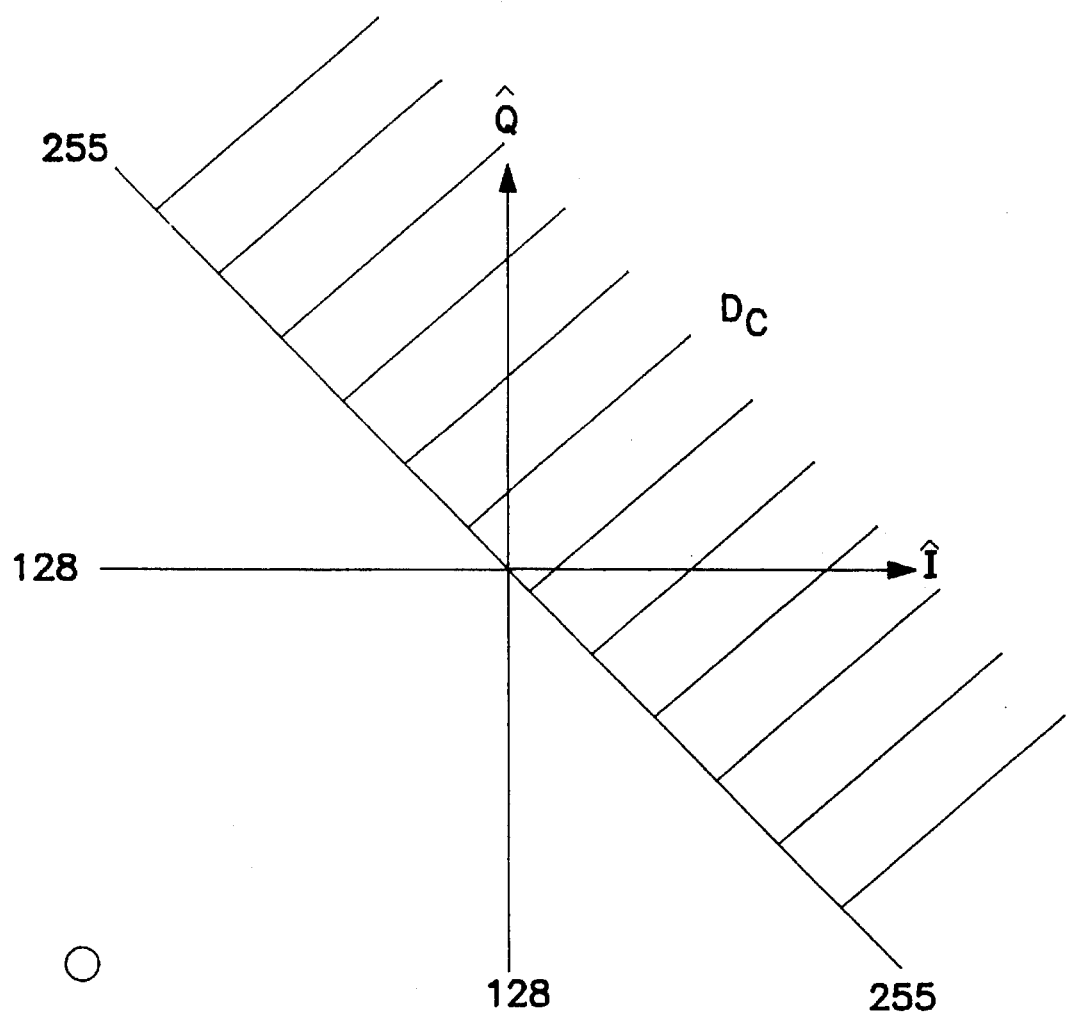
FIGS. 7a–7g illustrate the signal ranges at various locations in the processing unit.
Figure 7B:
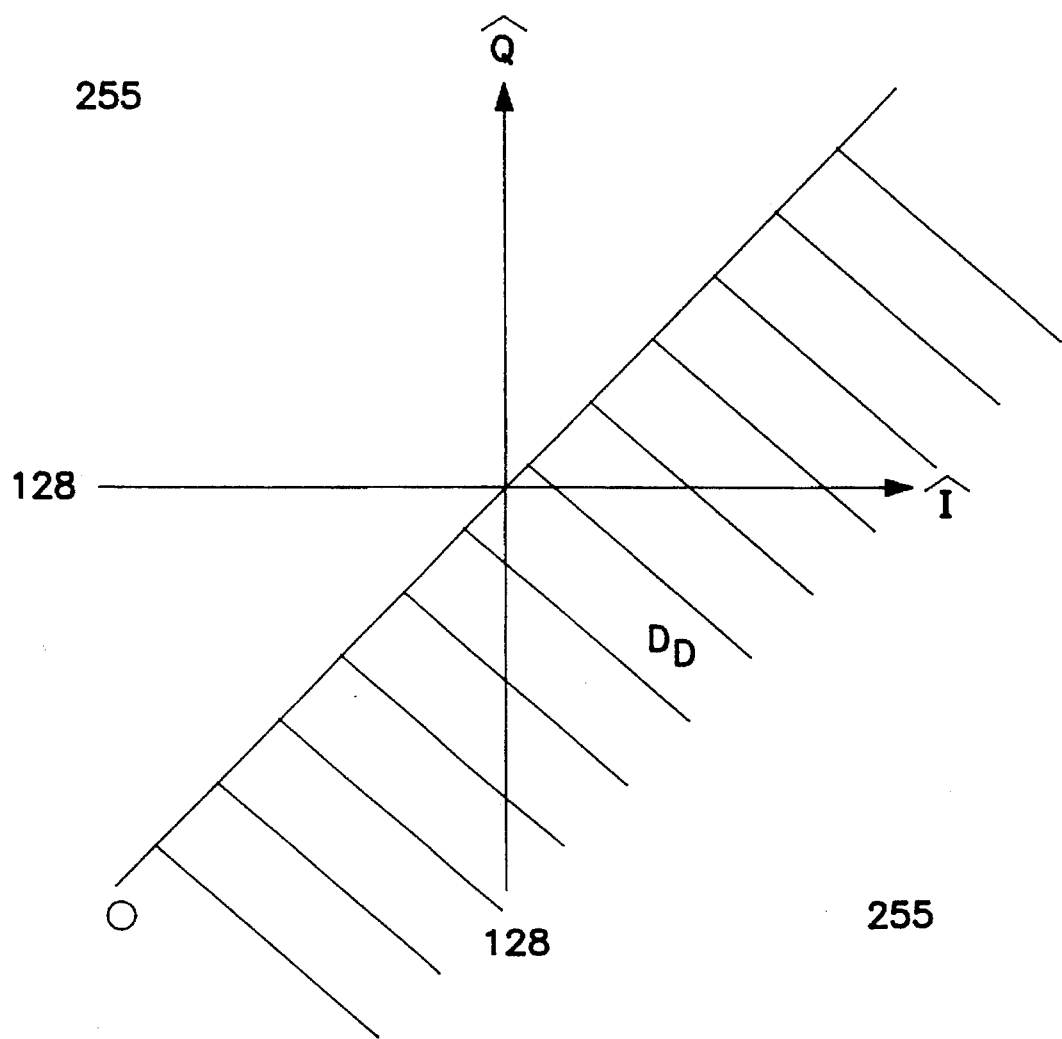

FIG. 2 shows the details of a processing unit 40 which uses rectangular detection regions for both carrier recovery and signal detection. The signal ranges at various locations in the processing unit 40 are illustrated in FIGS. 7a–7g. In FIG. 2, the I and Q signals provided by the analog to digital convertors 30 31 are applied to two full adders 41 and 43. The adder 41 forms the sum of I and Q while the adder 43 forms the difference between these two signals by subtracting Q from I through use of two's complement circuit 42. The overflow bits of the adders 41 and 43 are their respective output signals. The output signal of full adder 41 (location C in FIG. 2) is illustrated in FIG. 7a. The shaded region in FIG. 7a represents values of the I and Q signals for which I plus Q is greater than 255. If the I and Q values applied to the processing unit 40 (shown in FIG. 2) lie within the shaded region of FIG. 7a, then full adder 41 provides a one. Outside of the shaded region of FIG. 7a, the output signal of the full adder 41 is zero. FIG. 7b illustrates the output signal of full adder 43 (location D in FIG. 2). The shaded region in FIG. 7b represents values of the I and Q signals for which I plus the two's complement of Q is greater than 255. If the I and Q signals applied to the processing unit 40 (shown in FIG. 2) lie within the shaded region of FIG. 7b, then full adder 43 provides a one. Outside of the shaded region of FIG. 7b, the output signal of the full adder 43 is zero. The difference between the output signals of the full adders 41 and 43 is created through the use of device 42, which generates the two's complement of the Q signal component.

Figure 7C:
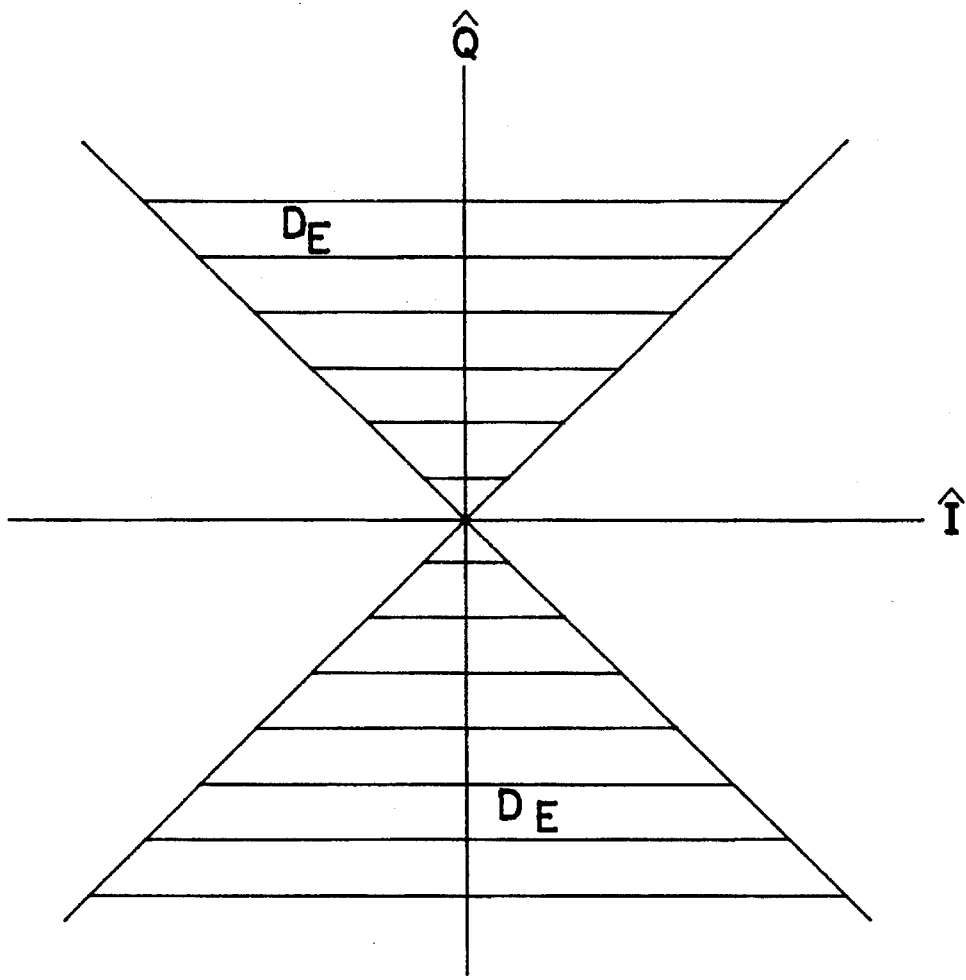

Referring to FIG. 2, signal C from adder 41 and signal D from adder 43 are applied to an exclusive OR gate 44. The shaded region in FIG. 7c represents values of the I and Q signals for which the exclusive OR of signals C and D is one. As shown in FIG. 7c, the output signal of the exclusive OR gate 44 is one when the I and Q signal components applied to the processing unit 40 (shown in FIG. 2) lie within the shaded region. The output signal of exclusive OR gate 44 is zero when the I and Q signal components applied to the processing unit 40 do not lie within the shaded region in FIG. 7c.

Figure 10:
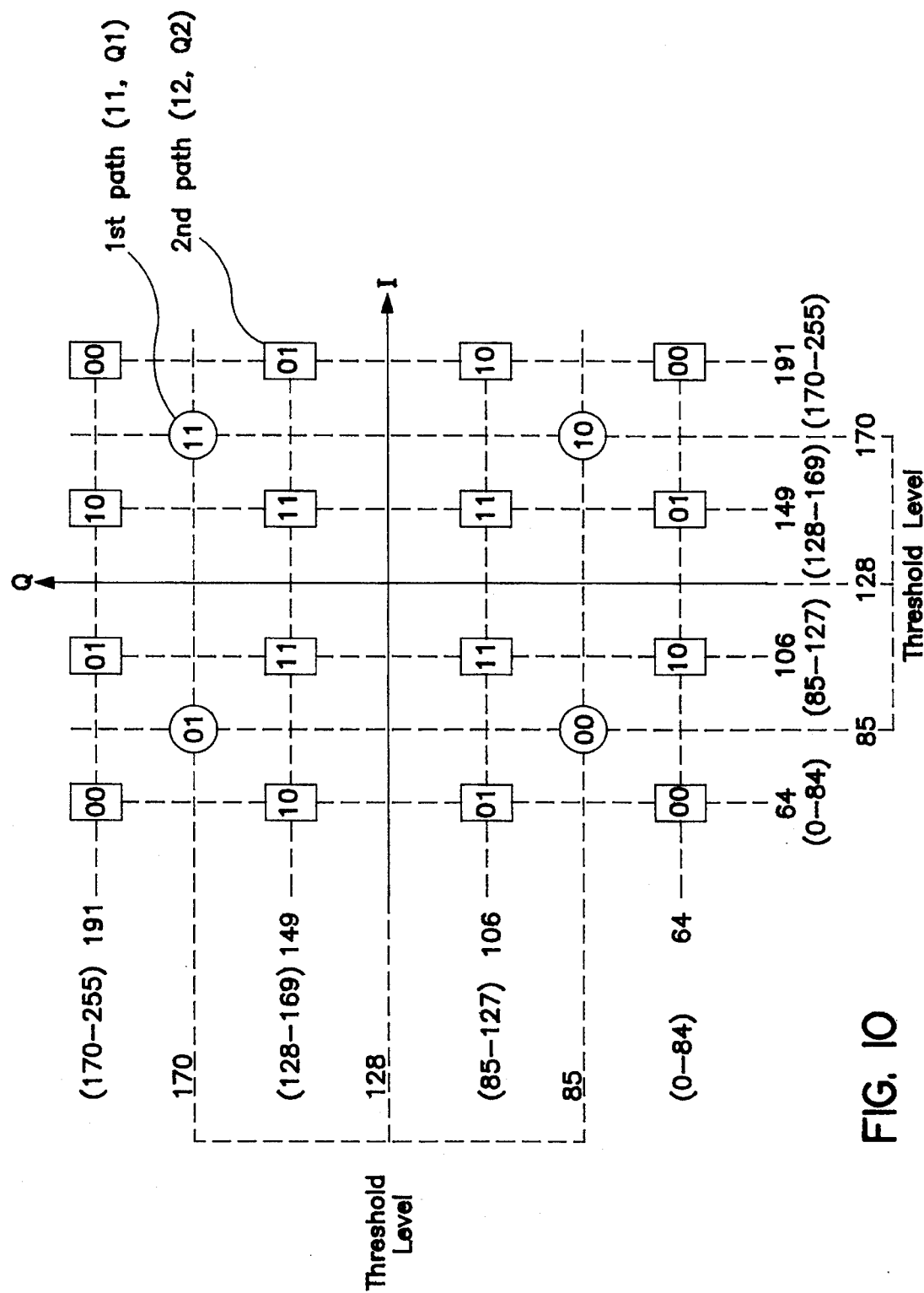
FIG. 10 illustrates the rectangular mapping performed in the processing unit.

Referring to FIG. 2, programmable read only memory (PROM) 48 receives the I and Q signal components applied to the processing unit 40 and maps the I and Q signal components into four single bit values i1, q1, i2, and q2. As illustrated in FIG. 10, the i1 and q1 values indicate which quadrant within the I and Q coordinate space the applied I and Q signal components appear. The values i1 and q1 also define thresholds which are used for establishing the rectangular detection regions. Values i2 and q2 define signal locations within each of the four quadrants of the I and Q coordinate space. The use of values i2 and q2 is discussed below with respect to exclusive OR gate 49.

Figure 7D:
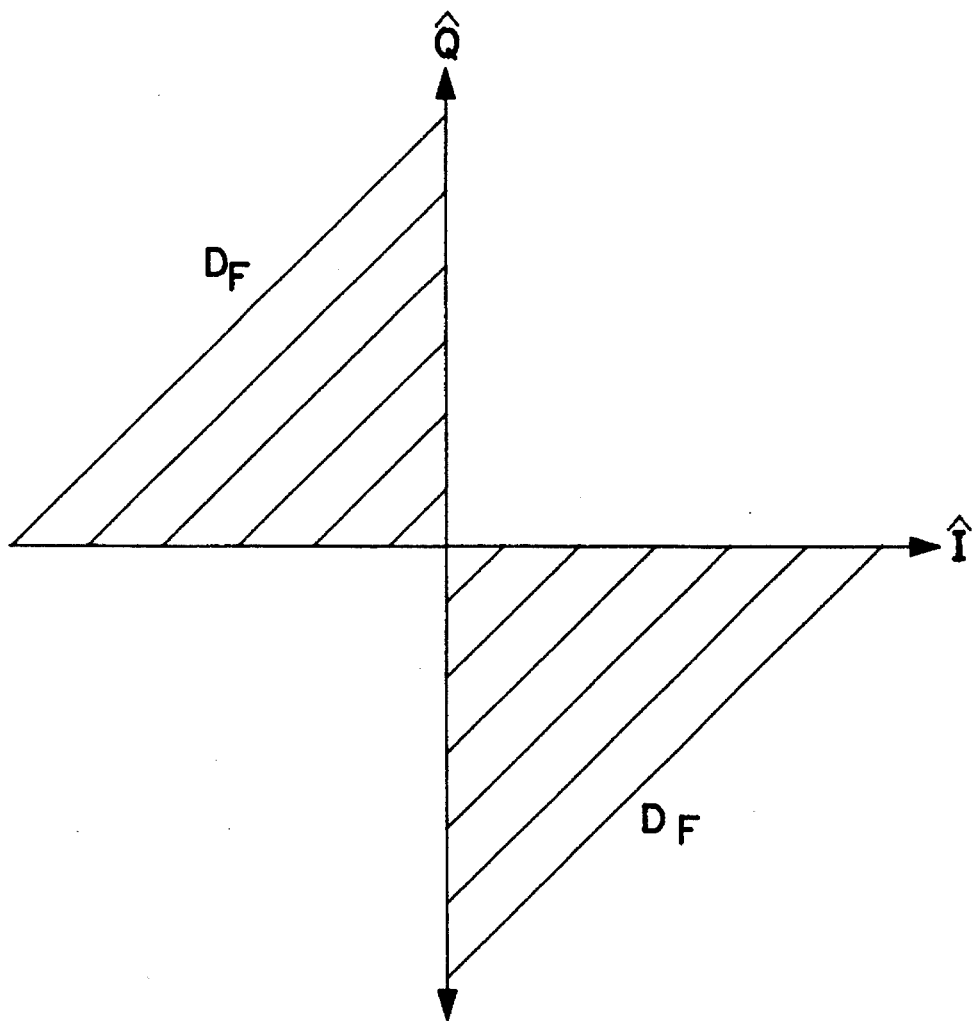

Referring to FIG. 2, exclusive OR gate 45 receives i1 and q1 as input signals. The output signal of exclusive OR gate 45 is illustrated in FIG. 7d. The shaded regions in FIG. 7d represents values of the I and Q signals for which i1 and q1 do not have the same value. If the I and Q signal components applied to the processing unit 40 (shown in FIG. 2) lie in a quadrant shaded in FIG. 7d, the output signal of the exclusive OR gate 45 is one. If I and Q signal components applied to the processing unit 40 lie in a quadrant that is not shaded in FIG. 7d, then the output signal of exclusive OR gate 45 is zero.

Figure 7E:
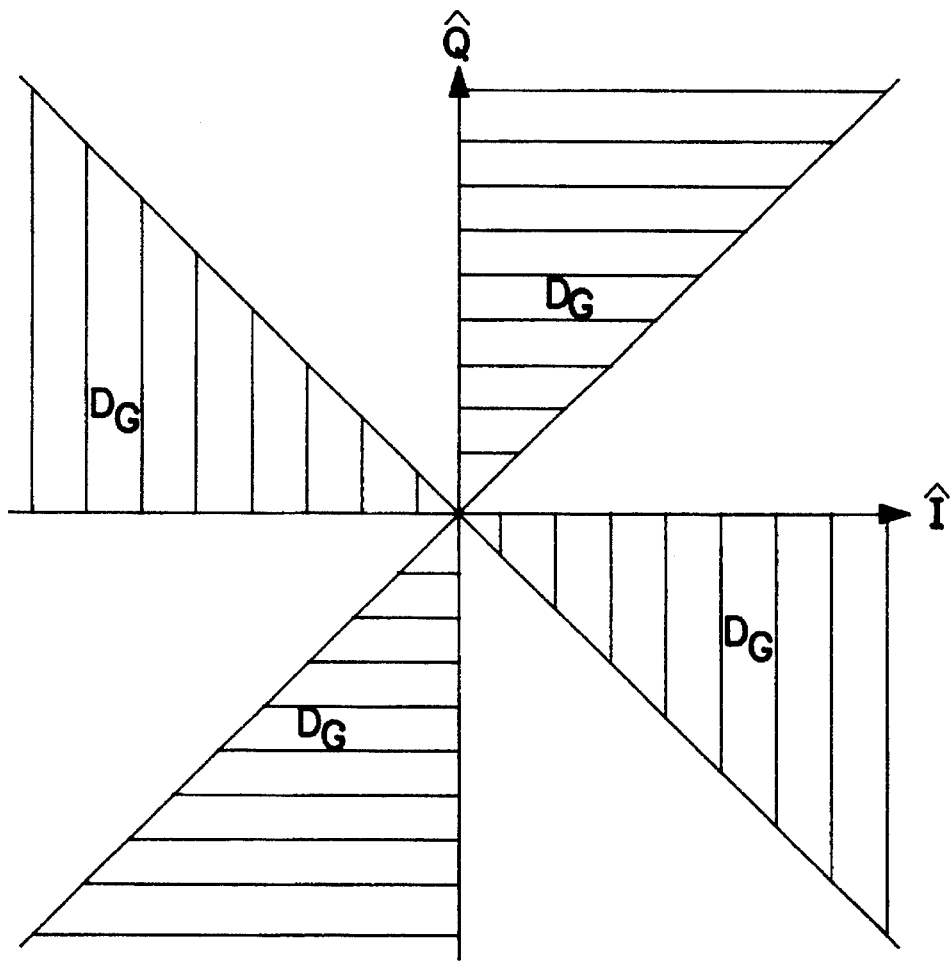

The output signals of exclusive OR gate 44 and exclusive OR gate 45 are applied to exclusive OR gate 46 (shown in FIG. 2). FIG. 7e shows the output signal of exclusive OR gate 46 relative to the I and Q signal components applied to the processing unit 40 (shown in FIG. 2). The shaded region in FIG. 7e represents values of the I and Q signals for which the exclusive OR of signal E from gate 44 and signal F from gate 45 is one. As shown in FIG. 7e, the output signal of the exclusive OR gate 46 is one when the I and Q signal components applied to the processing unit 40 lie within the shaded region. The output signal of exclusive OR gate 46 is zero when the I and Q signal components applied to the processing unit 40 do not lie within the shaded region in FIG. 7e.

Figure 7F:
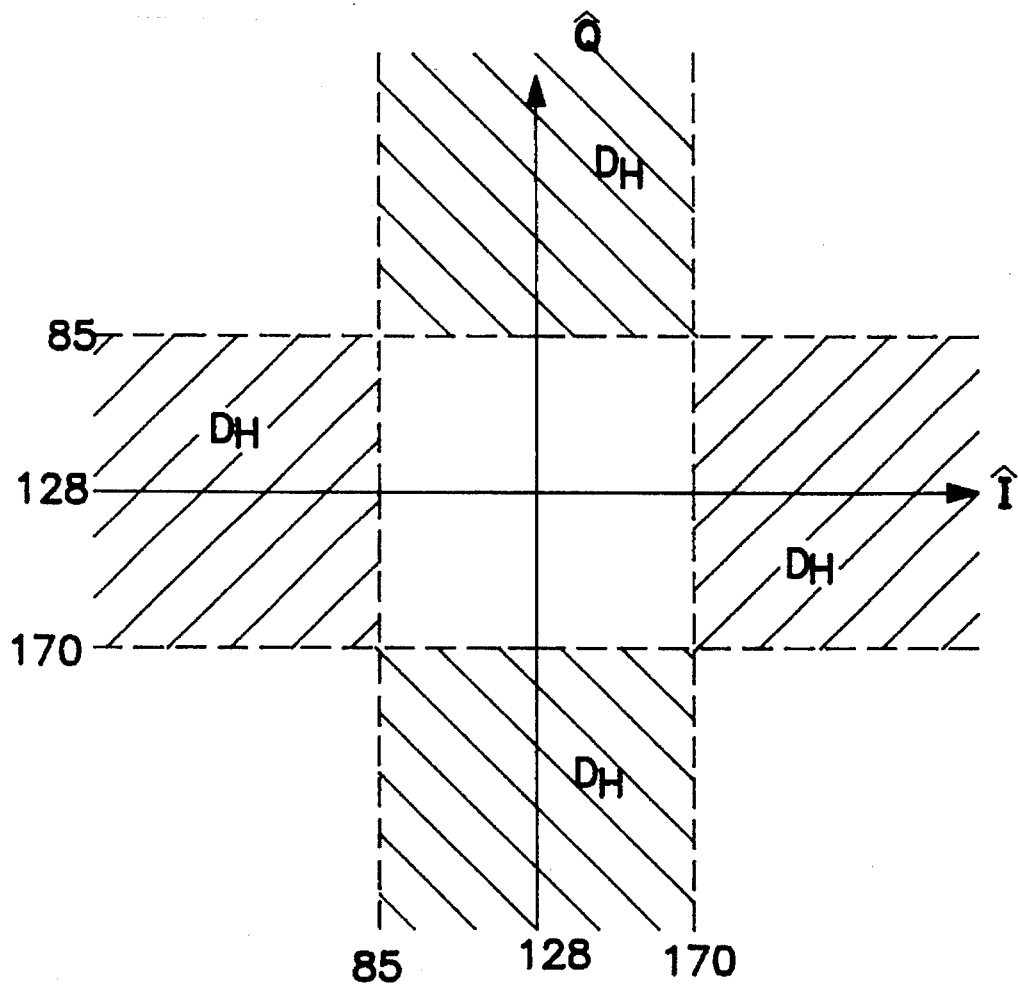

Referring to FIG. 2, the single bit values i2 and q2 are applied to exclusive OR gate 49. FIG. 7f shows the output signal of exclusive OR gate 49 relative to the I and Q signal components applied to the processing unit 40 (shown in FIG. 2). The shaded region of FIG. 7f represents values of the I and Q signals for which i2 and q2 do not have the same value. As shown in FIG. 7f, the output signal of the exclusive OR gate 49 is one when the I and Q signal components applied to the processing unit 40 lie within the shaded region. The output signal of exclusive OR gate 49 is zero when the I and Q signal components applied to the processing unit 40 do not lie within the shaded region in FIG. 7f. When the output signal of exclusive OR gate 49 is zero, the sample and hold 47 samples and holds the input signal received from exclusive OR gate 46.

Figure 7G:
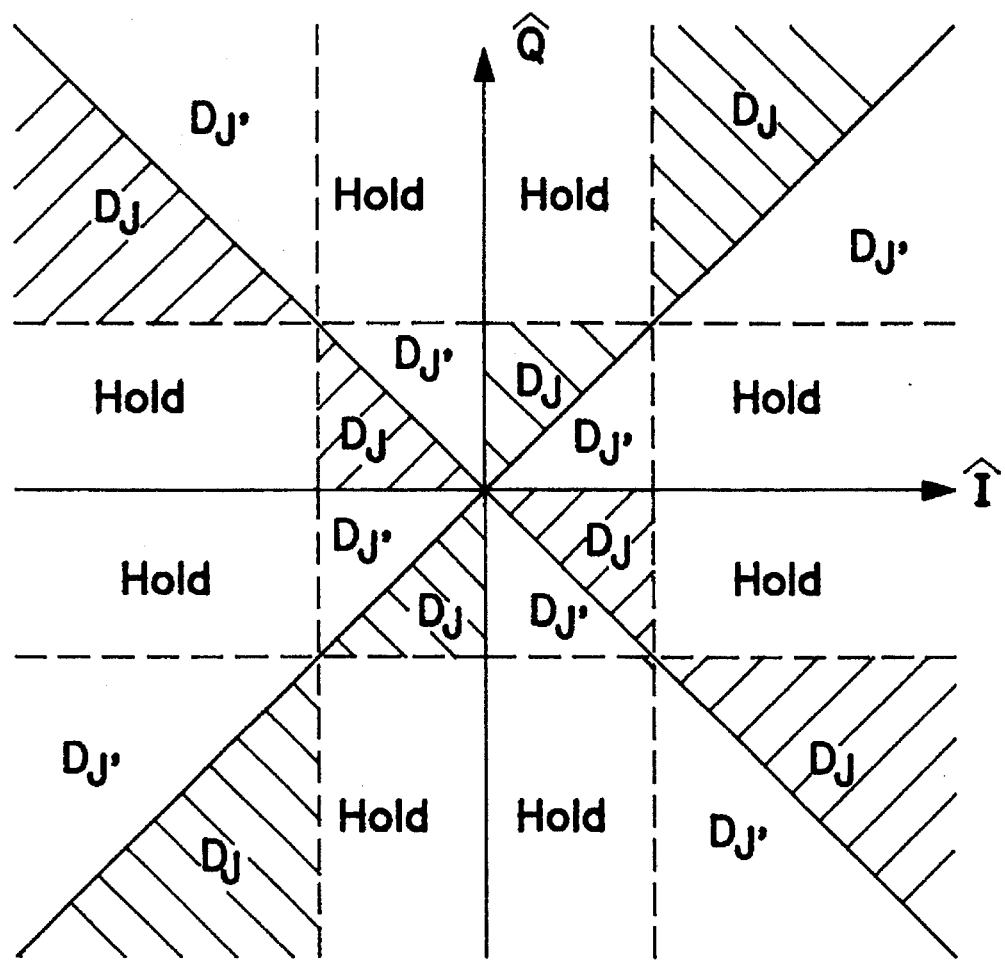

The output signal of sample and hold 47 (shown in FIG. 2) is illustrated in FIG. 7g. As shown in FIG. 7g, the output signal of the sample and hold 47 is one when the I and Q signal components applied to the processing unit 40 (shown in FIG. 2) lie within the shaded region, designated $D_J$. The output signal of the sample and hold 47 is zero when the I and Q signal components applied to the processing unit 40 lie within the region designated $D_J'$. The output signal of the sample and hold 47 remains the same, i.e. in the hold state, when the I and Q signal components applied to the processing unit 40 do not lie in either region $D_J$ or region $D_J'$. This state is illustrated by the word HOLD in certain regions of FIG. 7g.

FIG. 7g illustrates how the processing unit 40 (shown in FIG. 2) generates a phase error signal. For example, if the I and Q signal components applied to the processing unit 40 lie in the shaded region $D_J$, this indicates that the 16-QAM constellation has become rotated from the desired position. The processing unit 40 provides a value of one to low pass filter 50 which controls the voltage controlled oscillator 60. This alters the phase of the oscillatory signal provided by the voltage controlled oscillator and will rotate the 16-QAM constellation in a clockwise direction to the proper position. Conversely, when the I and Q sisal components applied to the processing unit 40 (shown in FIG. 2) lie in the region labeled $D_J'$, then the processing unit 40 provides a zero which has the opposite effect on the rotation of 16-QAM constellation (i.e. the constellation is rotated in a counter-clockwise direction).

Figure 6:
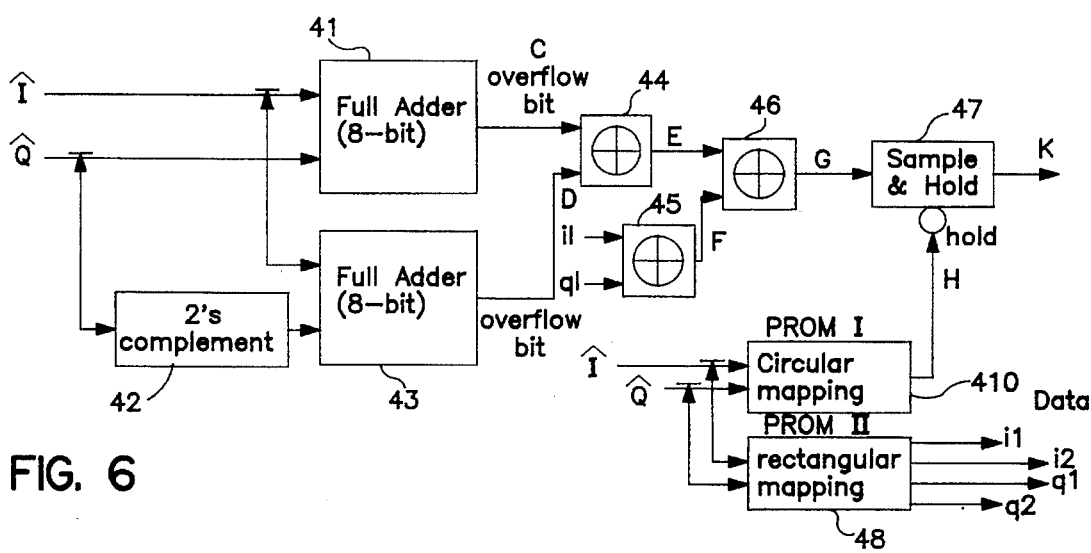
FIG. 6 illustrates the details of the processing unit including circular mapping.
Figure 4:
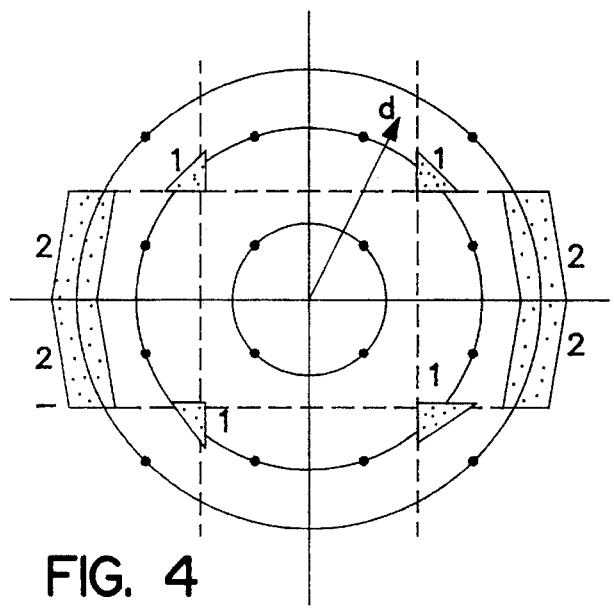
FIG. 4 illustrates a 16-QAM constellation and the rectangular decision regions conventionally used.

FIG. 6 illustrates the details of processing unit 40 (shown in FIG. 2) when circular mapping is used to control the sample and hold 47. FIG. 6 is similar to FIG. 2 and components which are functionally identical are assigned similar reference numerals. The processing unit 40 illustrated in FIG. 6 includes a circular mapping programmable read only memory (PROM) 410. The PROM 410 substantially reduces the problem of self noise, associated with rectangular detection regions, by making circular detection regions for carrier recovery. In this way, only sample points belonging to the proper vector magnitude contribute to the voltage controlled oscillator 60 (shown in FIG. 1). In addition, the full range of signal rotation can exist and a valid error signal can still be produced.

Figure 8A:
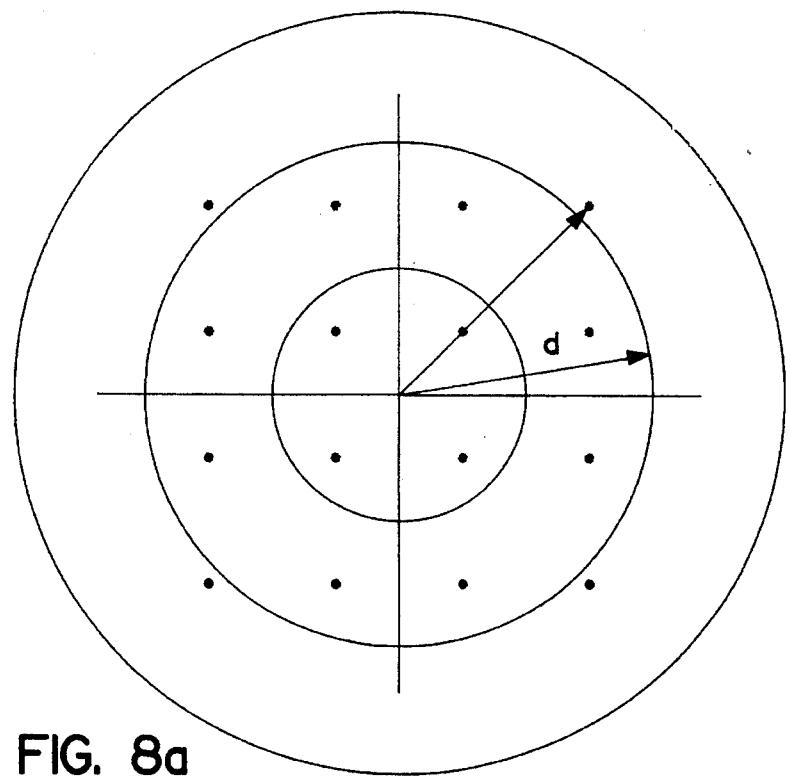
FIGS. 8a and 8b illustrate the use of circular mapping to define regions in a 16-QAM constellation.

FIG. 8a illustrates an example of a circular detection region used for carrier recovery. A phase error signal is supplied from the sample and hold 47 (shown in FIG. 6) when a vector defined by the I and Q signal components has a magnitude larger than the value d shown in FIG. 8a. If the circular detection region is set to the value d, then the signals in the outer orbit of the constellation can be used for carrier recovery and there will not be any self-noise contributed by other orbits.

Figure 8B:
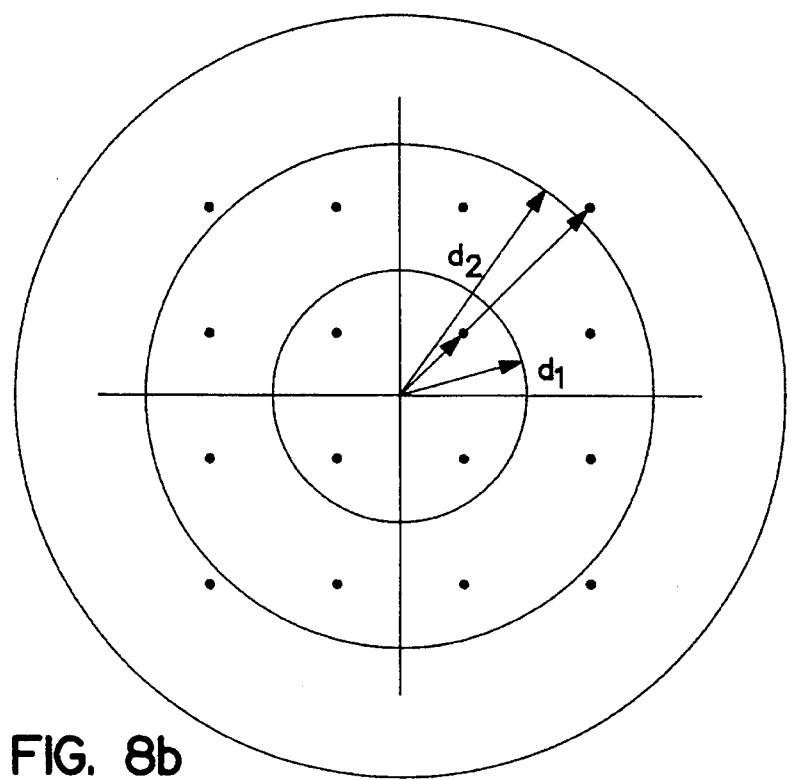

FIG. 8b illustrates the use of two circular detection regions. In general, any number of circular detection regions can be used, only the details of the implementation are more complex. For example, in the case of 16-QAM, detection regions for the inner 4 signals and the outer four signal could be implemented with a slightly larger ROM than the single detection region illustrated in FIG. 8a. In FIG. 8b, if the vector defined by the I and Q components of the input signal has a magnitude that is either less than d1 or greater than d2, then the sample and hold 47 (shown in FIG. 6) will provide a phase error signal.

Figure 9:
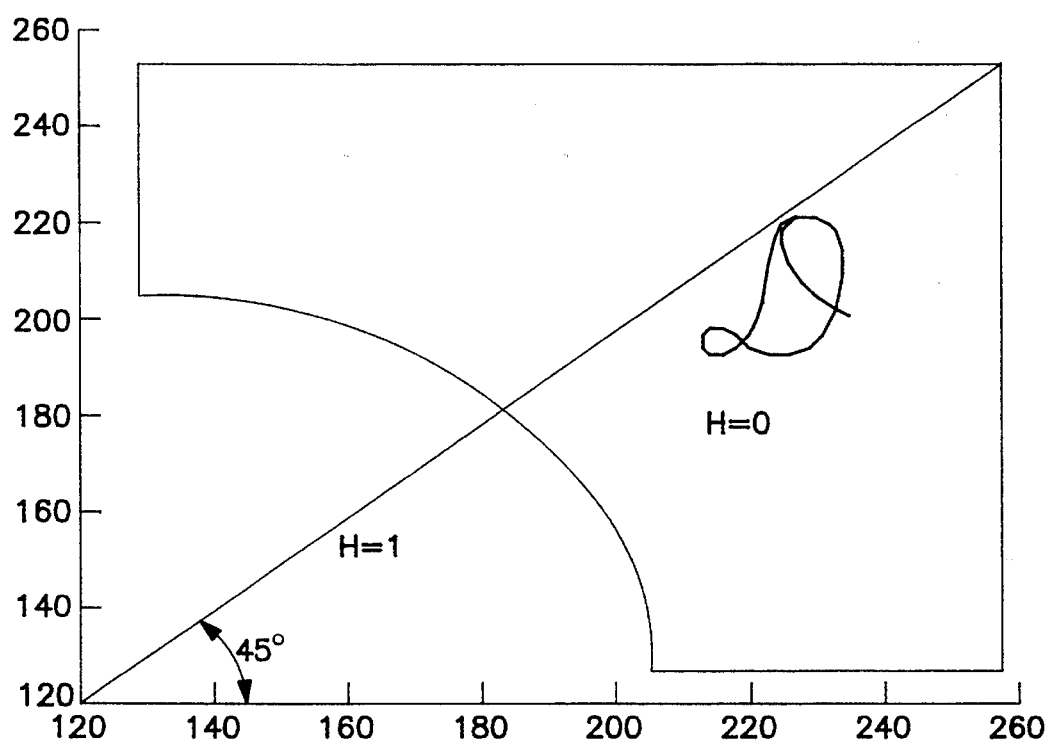
FIG. 9 illustrates one quadrant stored in a read only memory for implementing the circular mapping.
Figure 5A:
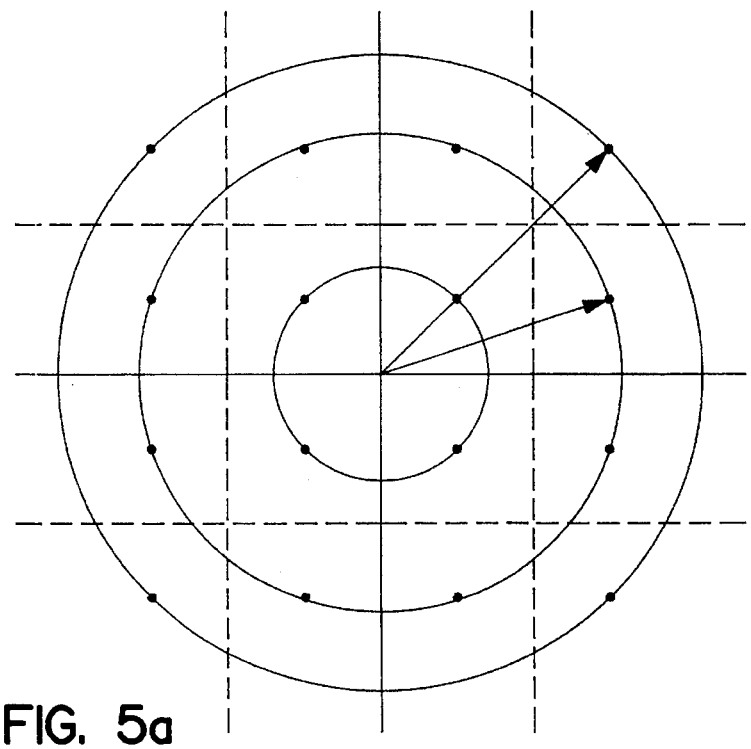
FIGS. 5a and 5b illustrate 16-QAM constellations and the effect of rotation on the constellation.
Figure 5B:
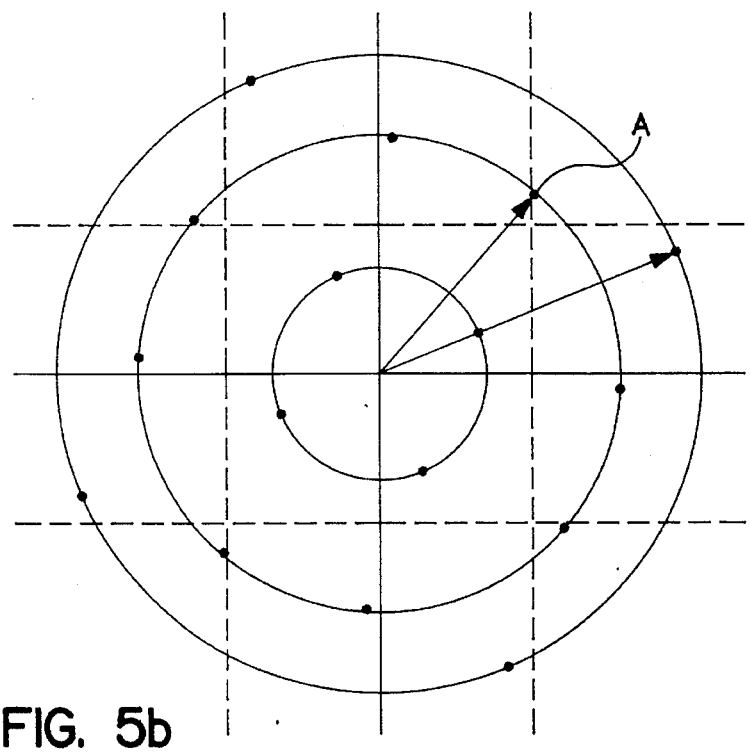

FIG. 9 illustrates the upper quadrant of the circularly mapped points stored within PROM 410 (shown in FIG. 6) using 256×256 points. In the example shown the vector magnitude d is selected to be 77 units long. If the magnitude of the vector defined by the I and Q components of the input signal exceeds 77 units, the output signal H from PROM 410 (shown in FIG. 6) will be zero. This will enable the sample and hold 47 (shown in FIG. 6) to provide a phase error signal.

Figure 11:
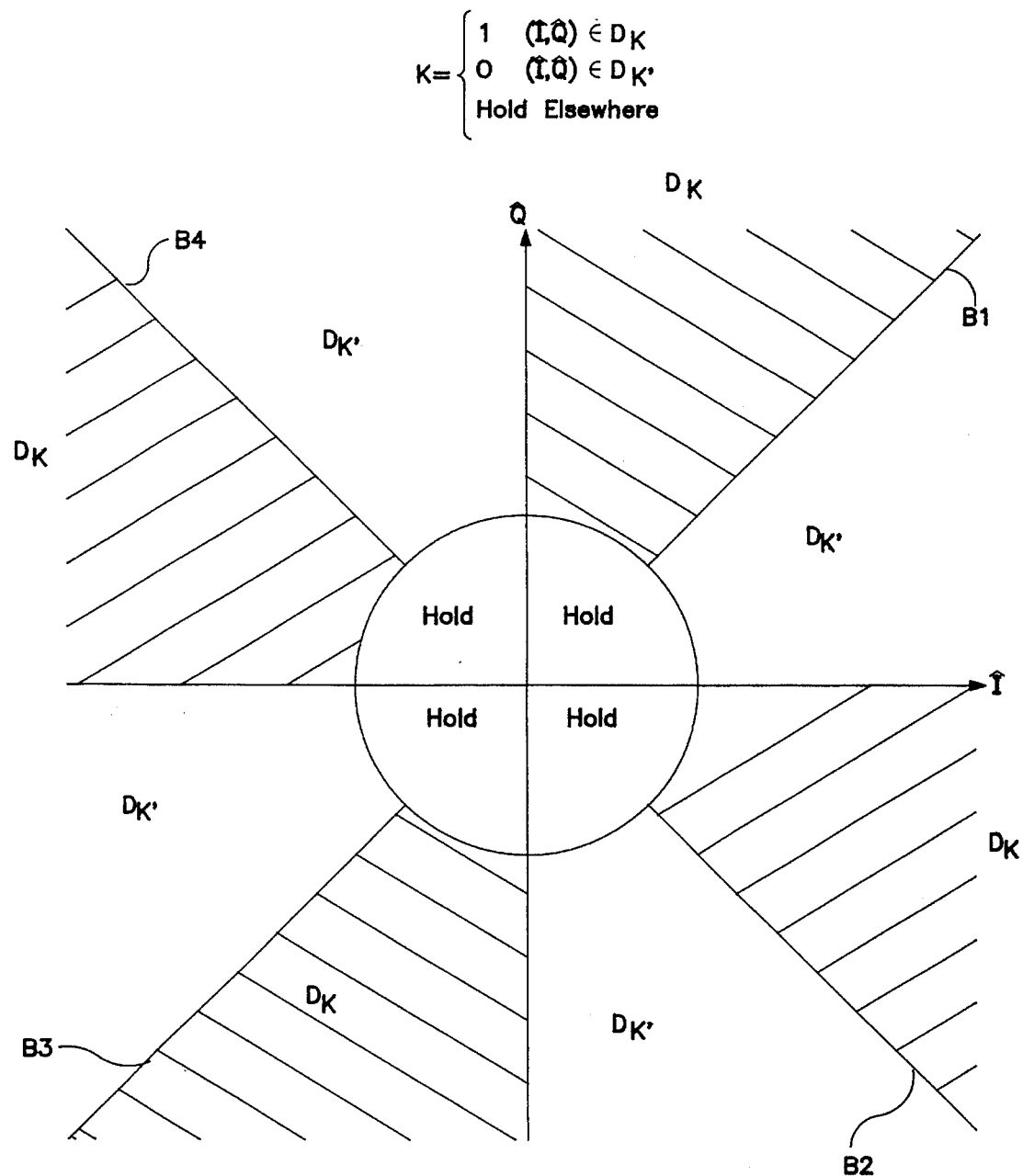
FIG. 11 illustrates the phase error signal ranges in one embodiment of the invention.

FIG. 11 illustrates the output signal from sample and hold 47 (shown in FIG. 6) in the embodiment which compares the magnitude of the vector defined by the I and Q components of the input signal to a single threshold. The output signal of the sample and hold 47 is one when the I and Q signal components applied to the processing unit 40 (shown in FIG. 2) lie within the shaded region, designated $D_K$. The output signal of the sample and hold 47 is zero when the I and Q signal components applied to the processing unit 40 lie within the region designated $D_K'$. The output signal of the sample and hold 47 remains the same, i.e. in the hold state when the I and Q signal components applied to the processing unit 40 do not lie in either region $D_J$ or region $D_K'$. This state is illustrated by the word HOLD in certain regions of FIG. 11.

FIG. 11 illustrates how the processing unit 40 (shown in FIG. 2) generates a phase error signal. For example, if the I and Q signal components applied to the processing unit 40 lie in the shaded region $D_K$, this indicates that the 16-QAM constellation has become rotated from the desired position. The processing unit 40 provides a value of one to low pass filter 50 which controls the voltage controlled oscillator 60. This alters the phase of the oscillatory signal provided by the voltage controlled oscillator and will tend to rotate the 16-QAM constellation in a clockwise direction to the proper position. Conversely, when the I and Q signal components applied to the processing unit 40 (shown in FIG. 2) lie in the region labeled $D_K'$, then the processing unit 40 provides a zero which has the opposite effect on the rotation of 16-QAM constellation (i.e. the constellation is rotated in a counterclockwise direction). The various regions in FIG. 11 effectively define a plurality of reference vectors coincident with diagonal boundaries B1, B2, B3 and B4 in FIG. 11. The vector defined by the in-phase and-quadrature components of the input signal is compared, in phase and magnitude, to these reference vectors in order to determine the appropriate phase error signal.

The use of polar observation regions for carrier recovery is a distinct improvement over the conventional use of rectangular detection regions. The ring shaped detection regions suppress the effects of self-noise which occur during carrier acquisition and phase tracking. The overall effect is an improvement in the performance of the Costas loop in being able to acquire and track the carrier component of multilevel QAM modulated signals.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A quadrature demodulation apparatus for demodulating an input signal which includes respective data signals modulating in-phase and quadrature carriers, the demodulation apparatus comprising:

a voltage controlled oscillator, responsive to a control signal, for generating an oscillatory signal;

a demodulator, coupled to receive said oscillatory signal and coupled to receive the input signal, said demodulator providing respective in-phase and quadrature phase components of said input signal;

phase comparison circuitry, responsive to said in-phase and quadrature phase components of said input signal for generating a phase error signal;

filter circuitry, responsive to said phase error signal, for generating said control signal for said voltage controlled oscillator; and phase error correction circuitry, responsive to said in-phase and quadrature components of said input signal, for selectively applying said phase error signal to said filter circuitry when a vector defined by said in-phase and quadrature components of said input signal exceeds, in magnitude, a first threshold.

2. The quadrature demodulation apparatus of claim 1, wherein said phase comparison circuitry determines said phase error signal by comparing a vector defined by said in-phase and quadrature components of said input signal, in phase and magnitude, to a plurality of reference vectors.

3. The quadrature demodulation apparatus of claim 1, wherein said phase error correction circuitry includes a read only memory (ROM) and wherein the magnitude of said vector defined by said in-phase and quadrature components of said input signal is compared, to said first threshold by applying the in-phase and quadrature components of said input signal as address input values to said ROM.

4. The quadrature demodulation apparatus of claim 3, wherein said phase error correction circuitry includes a switch and wherein the output signal of said ROM controls said switch to selectively inhibit application of said phase error signal to said filter circuitry.

5. The quadrature demodulation apparatus of claim 1, wherein said phase error correction circuitry applies said phase error signal to said filter circuitry when the magnitude of a vector defined by said in-phase and quadrature components of said input signal either a) exceeds a first threshold or b) is less than a second threshold.

6. The quadrature demodulation apparatus of claim 5, wherein said phase error correction circuitry includes a read only memory (ROM) and wherein the magnitude of said vector defined by said in-phase and quadrature components of said input signal is compared to said first threshold and said second threshold by applying said in-phase and quadrature components of said input signal as address input values to said ROM.

7. The quadrature demodulation apparatus of claim 6, wherein said phase error correction circuitry includes a switch, the output signal of said ROM controls said switch and said switch selectively inhibits application of said phase error signal to said filter circuitry.

8. A quadrature demodulation apparatus for demodulating an input signal which includes respective data signals modulating in-phase and quadrature carriers, the demodulator comprising:

oscillation means, responsive to a control signal, for generating an oscillatory signal;

demodulating means, coupled to receive said oscillatory signal and coupled to receive the input signal, said demodulating means providing respective in-phase and quadrature phase components of said input signal;

phase comparison means, responsive to said in-phase and quadrature phase components of said input signal for generating a phase error signal;

filter means, responsive to said phase error signal, for generating said control signal for said oscillation means; and phase error correction means, responsive to said in-phase and quadrature components of said input signal, for selectively applying said phase error signal to said filter means when a vector defined by said in-phase and quadrature components of said input signal exceeds, in magnitude, a first threshold.

9. The quadrature demodulation apparatus of claim 8, wherein said phase comparison means determines said phase error signal by comparing a vector defined by said in-phase and quadrature components of said input signal in phase and magnitude to a plurality of reference vectors.

10. The quadrature demodulation apparatus of claim 8, wherein said phase error correction means includes memory means and wherein the magnitude of said vector defined by said in-phase and quadrature components of said input signal is compared to said first threshold by applying the in-phase and quadrature components of said input signal as address input values to said memory means.

11. The quadrature demodulation apparatus of claim 10, wherein said phase error correction means includes switching means and wherein the output signal of said memory means controls said switching means to selectively inhibit application of said phase error signal to said filter means.

12. The quadrature demodulation apparatus of claim 8, wherein said phase error correction means applies said phase error signal to said filter means when the magnitude of a vector defined by said in-phase and quadrature components of said input signal either a) exceeds a first threshold or b) is less than a second threshold.

13. The quadrature demodulation apparatus of claim 12, wherein said phase error correction means includes memory means and wherein the magnitude of said vector defined by said in-phase and quadrature components of said input signal is compared to said first threshold said second threshold by applying said in-phase and quadrature components of said input signal as address input values to said memory means.

14. The quadrature demodulation apparatus of claim 13, wherein said phase error correction means includes switching means, the output signal of said memory means controls said switching means and said switching means selectively inhibits application of said phase error signal to said filter means.

15. A method for demodulating an input signal which includes respective data signals modulating in-phase and quadrature carriers, the method comprising the steps of:

generating an oscillatory signal which varies in frequency and phase in response to a control signal;

receiving said input signal;

demodulating said received input signal based on said oscillatory signal and providing respective in-phase and quadrature phase components of said input signal;

generating a phase error signal; and modifying said control signal by an amount dependent on said phase error signal when a vector defined by said in-phase and quadrature components of said input signal exceeds, in magnitude, a first threshold.

16. A method for demodulating an input signal of claim 15, wherein said phase error signal is generated by comparing a vector defined by said in-phase and quadrature components of said input signal, in phase and magnitude, to a plurality of reference vectors.

17. A method for demodulating an input signal of claim 15, further comprising modifying said oscillatory signal by an amount dependent on said phase error signal when the magnitude of a vector defined by said in-phase and quadrature components of said input signal either a) exceeds a first threshold or b) is less than a second threshold.

18. A quadrature demodulation apparatus for demodulating an input signal which includes respective data signals modulating in-phase and quadrature carriers comprising;

voltage controlled oscillator, responsive to a control signal, for generating an oscillatory signal;

demodulation circuitry, coupled to receive said oscillatory signal from the voltage controlled oscillator and the input signal, said demodulation circuitry providing in-phase and quadrature components of said input signal;

phase comparison circuitry, responsive to said in-phase and quadrature components of the input signal for generating a phase error signal, said phase error signal representing the difference, in phase and magnitude, between a vector defined by the in-phase and quadrature components of the input signal and reference vectors;

filter circuitry, responsive to the phase error signal, for generating said control signal for the voltage controlled oscillator; and phase error correction circuitry for selectively applying said phase error signal to said filter circuitry when a vector defined by the in-phase and quadrature components of the input signal either exceeds, in magnitude, a first threshold or is less than, in magnitude, a second threshold.

\* \* \* \* \*